(12) United States Patent
Rostek et al.

(10) Patent No.: US 8,516,826 B2
(45) Date of Patent: Aug. 27, 2013

(54) BLEED AIR DISTRIBUTION SUPPLY SYSTEM AND METHOD TO SUPPLY BLEED AIR TO AN AIRCRAFT

(75) Inventors: Norbert Rostek, Ost.-Scharmbeck (DE); Jürgen Rehbock, Stuhr (DE)

(73) Assignee: Airbus Operations, Hamburg (DE)

( * ) Notice: Subject to any disclaimer, the term of this patent is extended or adjusted under 35 U.S.C. 154(b) by 1147 days.

(21) Appl. No.: 12/083,008

(22) PCT Filed: Oct. 17, 2006

(86) PCT No.: PCT/EP2006/067490
§ 371 (c)(1),
(2), (4) Date: Apr. 3, 2008

(87) PCT Pub. No.: WO2007/045646
PCT Pub. Date: Apr. 26, 2007

(65) Prior Publication Data
US 2009/0235670 A1    Sep. 24, 2009

(30) Foreign Application Priority Data

Oct. 17, 2005    (DE) .......................... 10 2005 049 910

(51) Int. Cl.
*F02C 6/08* (2006.01)
*F02C 6/04* (2006.01)
*F02C 9/00* (2006.01)
*F02G 3/00* (2006.01)

(52) U.S. Cl.
USPC ............... 60/782; 60/39.091; 60/785; 60/795

(58) Field of Classification Search
USPC ................ 60/204, 226.1, 262, 266, 728, 782, 60/785, 39.83, 795, 39.091; 73/40; 137/15.11
See application file for complete search history.

(56) References Cited

U.S. PATENT DOCUMENTS 4,706,908 A    11/1987  Huffman
5,063,963 A *  11/1991  Smith .......................... 137/606
(Continued)

FOREIGN PATENT DOCUMENTS

| DE | 101 41 349 | 7/2002 |
|---|---|---|
| DE | 101 11 640 | 10/2002 |
| WO | 85/02906 | 7/1985 |

OTHER PUBLICATIONS

Avinash Basavraj Lakkundi, "Prediction of Crack Growth in Aircraft Engine Bleed Air Ducts Using Finite Element and Crack Growth Analysis" Master's Thesis Department of Mechanical Engineering, Wichita State University, May 2006, pp. 1-4 & 72.*

(Continued)

*Primary Examiner* — Ehud Gartenberg
*Assistant Examiner* — Arun Goyal
(74) *Attorney, Agent, or Firm* — Jenkins, Wilson, Taylor & Hunt, P.A.

(57) ABSTRACT

The invention relates to a bleed air supply system and a safety device for closing a valve in at least one of the several bleed air supply lines depending on an alarm signal that indicates an opening in at least one of the several bleed air supply lines. To stop the supply of bleed air irrespective of the type of the bleed air source, the safety device comprises a filter device for generating the alarm signal depending on the ground connection signal and on an opening signal from an opening signal device that indicates any opening of the bleed air supply line that is connected to the high-pressure ground connection.

13 Claims, 3 Drawing Sheets

(56) References Cited

U.S. PATENT DOCUMENTS

| | | | |
|---|---|---|---|
| 5,067,099 A * | 11/1991 | McCown et al. | 702/183 |
| 6,326,598 B1 | 12/2001 | Carvalho et al. | |
| 6,988,493 B2 * | 1/2006 | Wenger et al. | 123/559.2 |
| 2002/0125414 A1 | 9/2002 | Dammann | |

OTHER PUBLICATIONS

Embraer 135/145—Systems Summary [pneumatic—Air Conditioning—Pressurization}], accessed on Oct. 4, 2011 at http://www.smartcockpit.com/data/pdfs/plane/embraer/EMBRAER-135-145/systems/PNEUMATICS_AIRCONDITIONING_and_PRESURIZATION_E1.pdf; date of printing or posting unknown; Airliner in continuous production since 1995.*

Bombardier Global Express—Integrated Air Management System, accessed on Oct. 4, 2011 at http://www.smartcockpit.com/data/pdfs/plane/bombardier/GLOBALEXPRESS/systems/Global_Express-Integrated_Air_Management_System.pdf; date of printing or posting unknown; Airliner in continuous production since 1996.*

International Search Report for PCT/EP2006/067143 dated Apr. 3, 2007.

* cited by examiner

BLEED AIR DISTRIBUTION SUPPLY SYSTEM AND METHOD TO SUPPLY BLEED AIR TO AN AIRCRAFT

This application is the U.S. national phase of International Application No. PCT/EP2006/067490 filed Oct. 17, 2006 which designated the U.S. and claims priority to German Application No. 10 2005 049 910.4 filed Oct. 17, 2005, the entire contents of each of which are hereby incorporated by reference.

TECHNICAL FIELD

The present invention relates to a bleed air supply system and to a method for supplying bleed air to an aircraft, and in particular to a safety system for such a bleed air supply system.

BACKGROUND

The pneumatic system of an aircraft comprises a bleed air distribution system that can be fed by various sources in order to provide temperature-controlled air at high pressure for various purposes, such as, for example, among other things for supplying the air conditioning system of the aircraft.

During a flight the engines or an auxiliary power unit are/is used as sources/a source of bleed air. On the ground, the aircraft can also be supplied by way of an external bleed air source that is connected from the outside to the high-pressure ground connection of the bleed air supply system. The pre-conditioned bleed air in the distribution system usually has a pressure of approximately 4 bar and a temperature ranging between 150° C. and 260° C.

An overheat detection system OHDS monitors the actual temperatures in the vicinity of the hot-air lines of the bleed air system. The overheat detection system is used to prevent damage to the aircraft body and its components, which damage can arise due to a leak or fracture in a hot-air line of the bleed air system. Since the hot-air lines are located in the region of the engine suspension system, in the wings, in the fuselage and in the lower fairing, a leak can quickly result in impeding vital systems and structures. Within the context of this description no differentiation is made between a line leak and a line fracture, since they differ only in the types of openings in the line but not in their effect on the operation of the aircraft. The terms line leak and line fracture are therefore used synonymously in this document.

For the purpose of monitoring the bleed air supply system, the overheat detection system comprises sensor devices that are controlled by way of discrete lines and a data bus. The sensor device of the overheat detection system is arranged parallel to the bleed air lines and is used for measuring the temperature in the vicinity of these supply lines. Determining the temperature of the surroundings takes place in the form of impedance measuring by means of a measuring loop. In this arrangement a measuring loop usually comprises several coaxial sensors, connected in series, which sensors map the so-called OHDS loop.

In the case of a leak detected in the bleed air system of the aircraft, the affected region of the system is isolated and any further supply of bleed air from the associated bleed air source is stopped. Automatic isolation of the region affected by the line leak is furthermore accompanied by a visual or an acoustic warning signal in the cockpit. In this arrangement, for the purpose of accelerating the now required maintenance work, the position of the leak is displayed on the onboard maintenance system of the aircraft at a specified accuracy.

Impeccable automatic operation of the overheat detection system requires the electrical supply in the aircraft to be active, and electrically controllable valves to be present. As a rule, this condition is met both in flight and during time on the ground so that in the case of a leak the supply of further bleed air from a bleed air source such as the engine bleed air system or the auxiliary power unit can be stopped. However, if the bleed air supply is fed from an external bleed air source by way of the high-pressure ground connection of the bleed air supply system, then said bleed air supply cannot be automatically stopped because the high-pressure ground connection is designed as a nonreturn valve.

SUMMARY

It is thus the object of the present invention to create a device which, when a leak in the bleed air system of an aircraft occurs, makes it possible to stop the feed of bleed air independently of the type of bleed air source.

The invention is based on the idea of reacting in a measured way to the particular conditions when bleed air is supplied to an aircraft on the ground and to cause immediate switch-off of the supply of bleed air from the external source and/or to generate an alarm when a leak occurs in the feed line from the external source.

The bleed air supply system according to the invention for supplying bleed air to an aircraft with several bleed air supply lines between one or several bleed air sources and one or several consumers, each comprising at least one valve for setting the flow-through quantity passing through the bleed air supply line, and a safety device for closing the valve in at least one of the several bleed air supply lines depending on an alarm signal that indicates an opening in at least one of the several bleed air supply lines, is characterised in that the safety device comprises a connection display device for generating a ground connection signal when a bleed air supply line of the aircraft is connected to a high-pressure ground connection, and a filter device for generating the alarm signal depending on the ground connection signal and on an opening signal from an opening signal device that indicates any opening of the bleed air supply line that is connected to the high-pressure ground connection.

Preferred embodiments of the supply system comprise one or—to the extent that this is technically feasible—several of the following characteristics:

the arrangement of an on-off valve in the bleed air supply line connected to the high-pressure ground connection, which on-off valve can be controlled depending on the opening signal;

a signal output connection for emitting the opening signal to an external bleed air supply source that is connected to the high-pressure ground connection;

the integration of the signal output connection in the high-pressure ground connection of the aircraft;

the connection of the signal output connection to a control console of the aircraft;

the provision of a warning device for generating an alarm signal depending on the opening signal;

the emission of an acoustic alarm sound and/or a visual alarm signal, in the outside region of the aircraft, by the warning device.

The corresponding method according to the invention for controlling a bleed air supply system for supplying bleed air to an aircraft with several bleed air supply lines between one or several bleed air sources and one or several consumers, each comprising at least one valve for setting the quantity flowing through the bleed air supply line, and a safety device for closing the valve in at least one of the several bleed air supply lines depending on an alarm signal that indicates an opening in at least one of the several bleed air supply lines, is characterised by the steps of: generating a ground connection signal by a connection display device when a bleed air supply line of the aircraft is connected to a high-pressure ground connection; and generating the alarm signal by a filter device depending on the ground connection signal and on an opening signal from an opening signal device, which alarm signal indicates opening of the bleed air supply line connected to the high-pressure ground connection, of the safety device.

Preferred embodiments of the method for controlling the bleed air supply system comprise one or—to the extent that this is technically feasible—several of the following characteristics:

the arrangement of an on-off valve in the bleed air supply line connected to the high-pressure ground connection, which on-off valve is closed depending on the opening signal;

the issuing of the opening signal to an external bleed air supply source that is connected to the high-pressure ground connection, by way of a signal output connection;

the generation of an alarm signal by a warning device depending on the opening signal;

the emission of an acoustic alarm sound and/or a visual alarm signal, in the outside region of the aircraft, by the warning device;

the indication of the position of the leak with specified accuracy, by the warning device.

BRIEF DESCRIPTION OF THE DRAWINGS

Below, the invention is described in more detail by means of exemplary embodiments and with reference to the attached drawings, as follows.

DETAILED DESCRITPION

Figure 1:
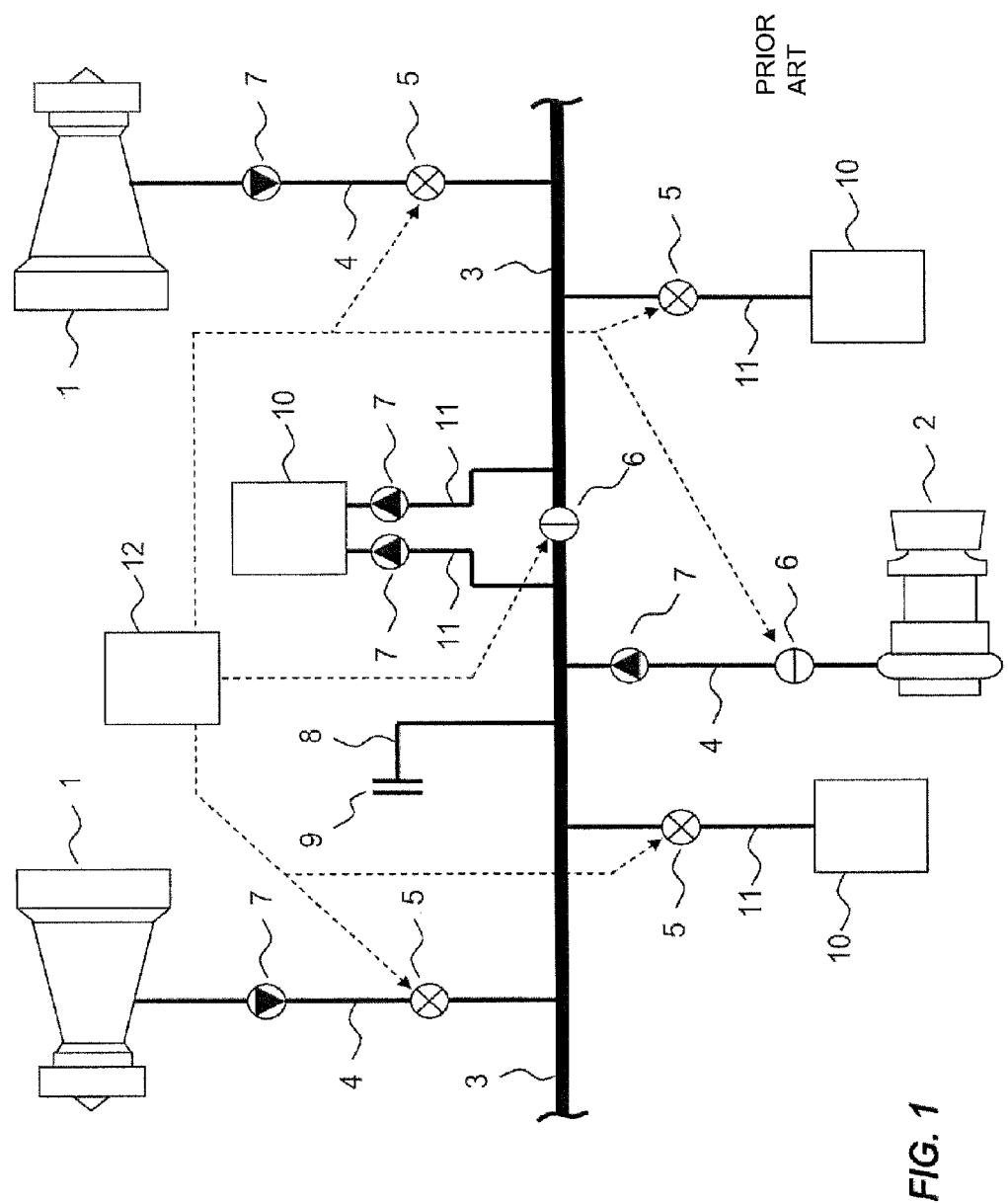
FIG. 1 shows a diagrammatic view of a bleed air system for an aircraft, according to prior art.

The diagram in FIG. 1 provides an overview of the design and function of a bleed air system for an aircraft. The bleed air distribution system serves the purpose of distributing the bleed air that is taken from the various bleed air sources to various consumer systems in the aircraft, such as e.g. the air conditioning system. It is therefore also referred to as a bleed air supply system. Apart from the engines 1 it is also possible to use an auxiliary power unit 2 as a gas generator and thus as a bleed air source. The bleed air is distributed in the aircraft by way of a main line 3. The bleed air sources 1 and 2 are connected to this main line 3 by way of feed lines 4. In the feed lines 4, valves are provided by means of which the quantity that flows through the feed line 4 from the bleed air source 1 or 2 to the main line 3 can be set. In particular, the supply can be reduced or turned off altogether. Therefore, depending on the capacity of the source the valves are designed as regulating valves 5 for gradually setting the flow-through quantity or as simple on-off valves 6 for opening or closing the feed line 4.

In order to prevent any return flow of air from the main line 3 to the respective generator system 1 or 2 in case the pressure in the main line 3 exceeds the pressure in the generator system, nonreturn valves 7 are provided in the feed lines 4, which nonreturn valves permit the flow of the operating fluid or supply fluid in one direction only.

While the aircraft being on the ground the required bleed air, apart from by the aircraft-internal generators, can additionally be provided by one or several external bleed air sources (not shown). The external bleed air source is connected by way of a high-pressure ground connection 9; with the corresponding connection line between the high-pressure ground connection 9 and the main line 3 being designated 8 in FIG. 1. The high-pressure ground connection 9 is designed such that any escape of bleed air from the main line 3 by way of the high-pressure ground connection 9 towards the outside is prevented.

The consumer systems 10 are connected to the bleed air system by way of various feed lines 11. These feed lines too as a rule comprise nonreturn valves 7 in order to prevent the return flow of gas from the consumer to the system. In addition, or as an alternative, control valves 5 can be installed in the feed lines 11 to the respective consumer 10. Feed lines 11 to a consumer 10 in which return valves 7 are installed are shown in the case of the upper consumer 10 in FIG. 1. Feed lines 11 to a consumer 10 in which control valves 5 are installed are shown in the case of the two lower consumers 10 in FIG. 1.

The consumers 10 can be connected to the system by way of one or several feed lines 11. This is advantageous in particular with that type of consumer 10 that have to be continuously supplied. Since it must be possible to switch off sections of the main system in the case of a consumer 10 with two or more lines 11, the supply can be changed over from one train of the bleed air system to another when one train is switched off. A consumer 10 comprising two feed lines 11 is shown in the middle of FIG. 1. Each feed line has a nonreturn valve 7. The feed lines are connected to two separable circuits of the bleed air system, which can both be decoupled from each other by the regulating valve 6 so that in FIG. 1 a left-hand and a right-hand graduated circle results, which are both supplied by an engine 1, or by an engine 1 and in addition by an auxiliary power unit 2.

In order to be able to react quickly or to prevent major damage in the case of a leak or line fracture in the bleed air supply system, all the control valves 5 and on-off valves 6 are designed such that they can be closed by a safety device 12. Monitoring in relation to leaks and the like in the system is effected in particular by means of an overheating detection system (not shown) that can detect and localise a leak in the hot air lines of the system by monitoring the temperature in the vicinity of these lines. The overheating detection system reports a leak directly to the safety device 12. In that the safety device 12 closes the valves immediately adjacent to the leak, the region of the bleed air supply system that is affected by a leak can be isolated. If necessary, furthermore, any further supply of bleed air from the affected engine or auxiliary engine is stopped by closing off the feed line. To this effect the safety system 12 is connected, by way of control lines, to all the valves in the bleed air system. These control lines are shown as dashed lines in FIGS. 1 and 2.

However, in the case of bleed air supply from the external bleed air source, the supply of bleed air from the external source cannot be automatically stopped without further ado. While the leak is displayed in the cockpit of the aircraft by the onboard warning system and the onboard maintenance system, when the aircraft is on the ground there are not necessarily any personnel present in the cockpit. Furthermore, the display does not indicate that the supply from the external bleed air source should be stopped. Consequently the personnel responsible for operating the bleed air source may only be informed with considerable delay, or may not be informed at all. In both cases the hot air escaping from the bleed air supply system may have an enduring effect on components and systems of the aircraft, which components and systems are arranged adjacent to the leak, with the consequences that equipment that is essential for safe operation of the aircraft can be damaged.

Figure 2:
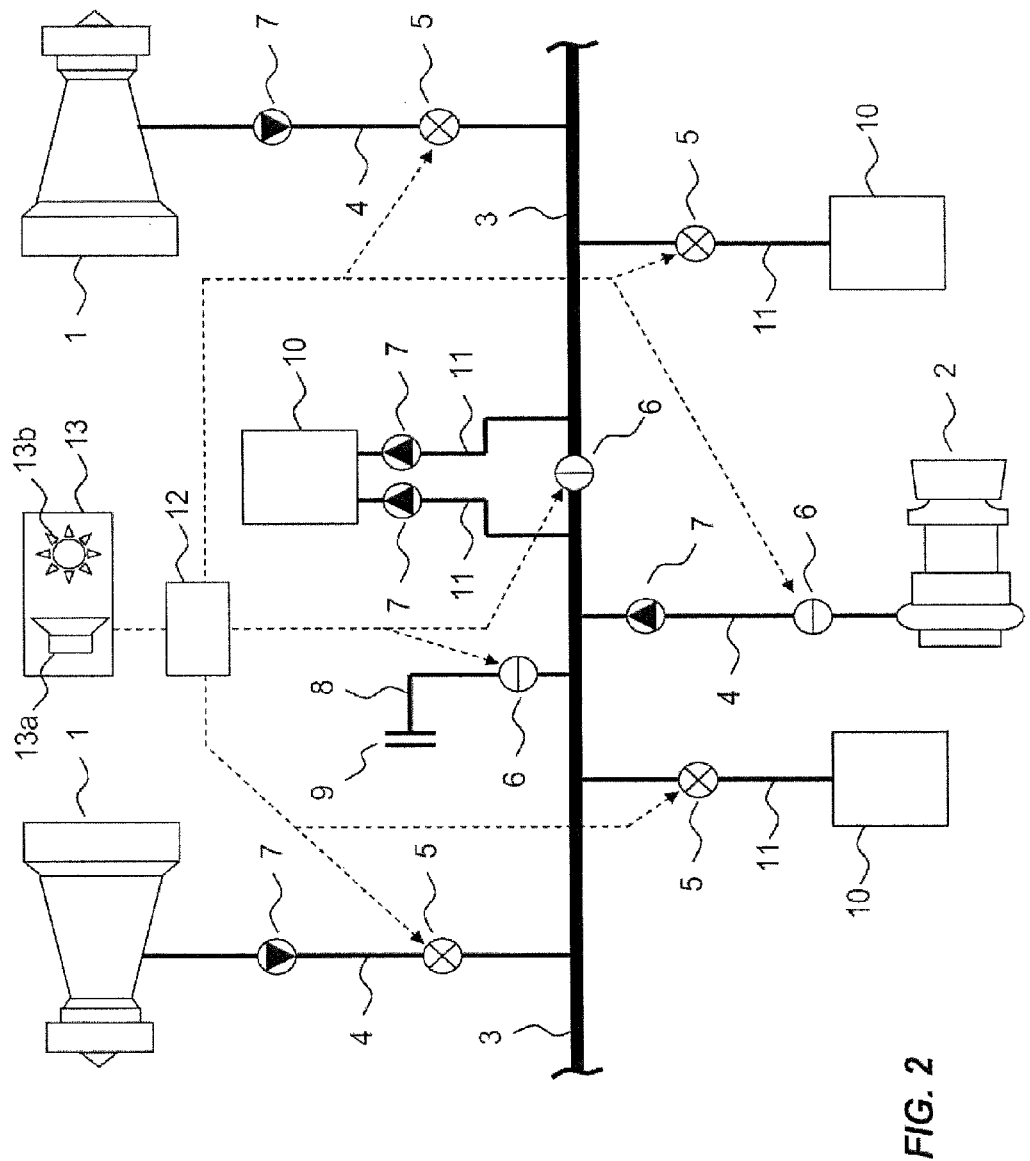
FIG. 2 shows a safety device according to the invention for a bleed air supply system of an aircraft.

In order to shorten the reaction time following a leak, according to the invention it is proposed that the safety device 12 evaluates all the signals available such that a defective spot in the supply system can be detected more rapidly and that major damage can be prevented by quickly closing off the supply of bleed air. According to the invention the signals of the overheat detection system are evaluated taking into account the information that the leak occurs during bleed air supply by way of a high-pressure ground connection 9 of the aircraft. FIG. 2 shows the supply system with such a safety system 12. In an advantageous embodiment the safety system 12 is connected to a controlled on-off valve 6 between the high-pressure ground connection and the bleed air supply system. This valve 6 between the high-pressure ground connection 9 and the main line 3 is controlled in such a manner that it closes as soon as during bleed air supply, by way of the high-pressure ground connection 9, a leak in the bleed air supply system occurs. As is the case in the aircraft-internal bleed air sources 1 and 2, the valve 6 is advantageously arranged in the inlet of the bleed air supply system to the high-pressure ground connection 9. The valve 6 can also comprise several individual valves (not shown), which can separately open and close individual trains of the feed line.

Figure 3:
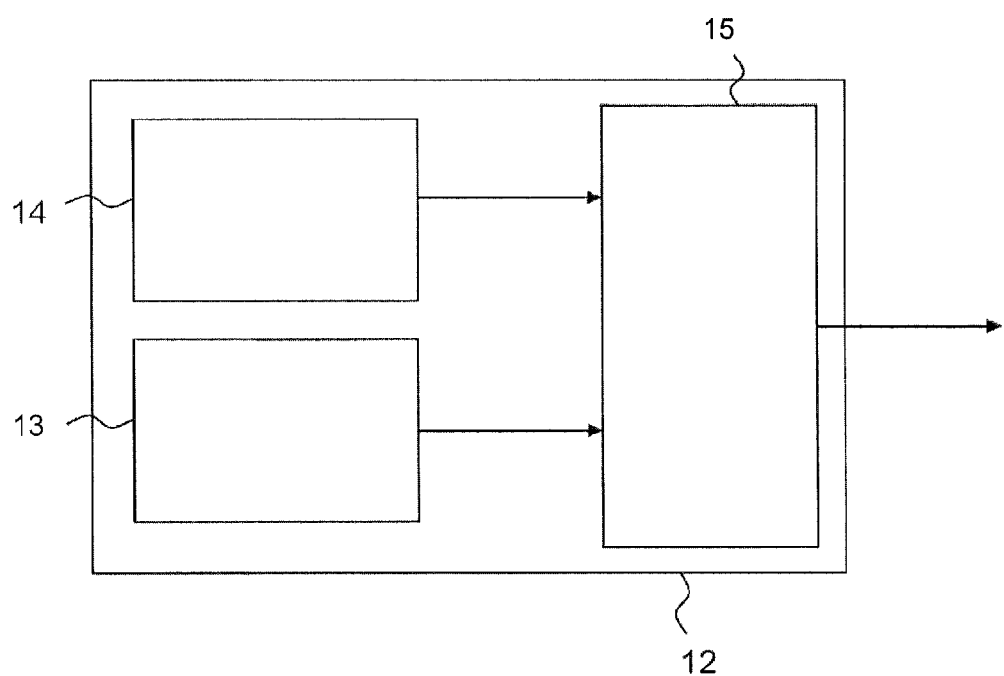
FIG. 3 shows a block diagram of the safety device for a bleed air supply system of an aircraft, according to FIG. 2, according to the invention.

The safety system 12 for the bleed air supply system of the aircraft comprises three components. These form part of the system, but, like the overall system, they can also comprise further components and partial systems. The three components of the safety system 12 are a connection display device 13, an opening signal device 14, and a filter device 15, which will be explained below with reference to FIG. 3.

The connection display device 13 of the system 12 is used for generating a ground connection signal that shows the bleed air supply of the aircraft by way of the high-pressure ground connection 9. In the simplest case the signal indicates that a bleed air source is connected to the high-pressure ground connection 9. The signal can be generated by way of a mechanical sensor, for example a switch, key button or the like, but also by means of non-contacting sensors. In order to monitor an actual supply of bleed air from an external bleed air source, advantageously pressure sensors, flow sensors or temperature sensors on the high-pressure ground connection 9 or on its feed lines 8 are used. A combination of various sensors can improve the reliability when detecting that the signal generated reflects an actual external supply of bleed air.

The opening signal device 14 is used to generate an opening signal that indicates a leak in a line of the bleed air supply system. To generate the signal, this opening signal device 14 can be based on a leak signal of the overheat detection system. Since due to the high pressure, damage to the aircraft systems can arise even in the case of a leak in the cold-air lines of the bleed air system, the opening signal device 14 can also use a leak warning signal for this part of the line system to generate the opening signal. In this case the opening signal is advantageously formed on the basis of a logical OR operation of both leak signals. In this context the term logical OR operation relates to a linkage of the leak signals, which linkage when at least one leak occurs generates a control signal to display the presence of a leak. Depending on the form of the signals to be processed, the technical embodiment of this engineering logic can thus definitely differ from a technical OR operation.

The filter device 15 of the safety system 12 is used to generate an alarm signal depending on the ground connection signal and on the opening signal. Since the information content of the third alarm signal indicates that a leak in the bleed air system of the aircraft has occurred and the bleed air supply of the aircraft takes place from an external bleed air source by way of the high-pressure ground connection 9, generating the alarm signal is advantageously based on a logic AND operation of the ground connection signal and of the opening signal. The term logical AND operation refers to an operation which produces a signal to indicate a leak in the case of external bleed air supply by way of the high-pressure ground connection 9 only in those cases where both a leak signal of the opening signal device 14 and a signal of the connection display device 13 is present, which signal indicates external bleed air supply. Depending on the design of the ground connection signal and the opening signal, the logical AND operation can also be designed as a technical OR operation or the like.

The three described components of the control system 12, namely the connection display device 13, the opening signal device 14 and the filter device 15 can be designed either in the form of an electronic circuit or in the form of an automatic control program in a data-processing circuit.

The valve 6 between the high-pressure ground connection 9 and the main line 3 is controlled by the alarm signal of the safety system 12 such that it closes as soon as the information content of the control signal reflects the occurrence of a leak in the bleed air supply system with concurrent bleed air supply by way of the high-pressure ground connection 9.

As an alternative or in addition, the alarm signal can also be used to automatically terminate the supply of bleed air to the high-pressure ground connection 9, i.e. said alarm signal can be used to stop the supply of bleed air from outside the aircraft into the high-pressure ground connection 9. To this effect transmission of the third control signal to the external region of the aircraft is ensured, and further supply of bleed air to the high-pressure ground connection is stopped. In a preferred embodiment an electrical or optical plug-in contact (not shown) on the high-pressure ground connection 9 is provided for this purpose. Said electrical or optical plug-in contact (not shown) interacts with a complementary plug-in contact (not shown) on the feed line from the external bleed air source such that when the feed line is connected to the high-pressure ground connection a secure plug-in connection automatically results.

The alarm signal transmitted by way of the plug-in connection created in this way can now be used both for blocking a line for the bleed air supply to the high-pressure ground connection of the aircraft, and alternatively, or in addition, for turning off the device that supplies bleed air to the high-pressure ground connection 9 of the aircraft.

As a means for blocking the feed line, preferably a valve 6 in the feed line 8 is arranged, which valve is designed to be closed by way of the alarm signal as soon as the alarm signal detects a combination of a leak and external bleed air supply. As a means for switching off the external bleed air supply a control circuit (not shown) for switching off the external bleed air source is provided. The control circuit causes the bleed air source to be switched off in those cases where the information content of the alarm signal indicates a combination of a leak and external bleed air supply. The control circuit can be designed either in the form of an electronic circuit or in the form of an automatic control program in a data-processing circuit.

In a further preferred embodiment the safety system 12 is connected to a connection display device 13 that comprises an acoustic element 13a as well as a visual element 13b. The connection display device 13 according to this embodiment thus generates an acoustic warning sound and/or a visual warning signal in the outside region of the aircraft. The connection display device 13 is a warning device that takes account of the particular hazard situation in the case of a leak in the bleed air system during bleed air supply from an external source. Said connection display device 13 generates a warning signal that acts on human sensory perception, thus notifying the responsible personnel of the hazardous situation.

Advantageously the warning signal is displayed or emitted on the onboard warning/maintenance system (not shown). In order to alert operating personnel in the external region of the aircraft, in particular operating personnel of a stationary or mobile external bleed air supply device, to the hazardous situation, the connection display device 13 advantageously comprises an electro-acoustic or electro-optic transducer on the outer skin of the aircraft. In a further advantageous embodiment, the connection display device 13 comprises a radio device which can trigger an acoustic and/or visual warning signal on the communication devices of the operating personnel.

The safety system 12 designed according to the invention makes it possible to quickly interrupt the supply of bleed air from an external source essentially in three ways, namely by interruption initiated by a controllable aircraft-internal valve 6, by external signalling for the ground personnel, or by interruption initiated by a controllable external device, be it the compressor for the bleed air itself or be it a valve in an external line. The advantages or disadvantages of the individual solutions consist of the automatically controllable internal valve contributing to the weight of the aircraft but on the other hand rendering the system of the aircraft independent. When issuing signals for the ground personnel, the latter must be able to react and must be within reach of the device 13a or 13b. On the other hand, external signalling provides a particularly simple solution which can also fully be part of the aircraft itself so that the aircraft does not depend on external devices for signalling. Lastly, in the case of an automatically controllable external device, i.e. a valve or a compressor, a cable connection to the outside is required. To this effect a further interface both on the aircraft and on the ground is required. On the other hand, in this way weight (of the valve 6) in the aircraft can be saved, and the system operates independently of ground personnel.

Taking into account individual advantages and disadvantages depending on a given case of application, the average person skilled in the art will select a suitable solution from among the solutions stated.

Since the invention considerably shortens the time it takes to stop the supply of bleed air from an external bleed air source, systems of an aircraft that are located in the vicinity of a leak in the bleed air supply system are protected earlier than has been the case up to now against any damaging effect caused by bleed air. The invention presented thus makes a significant contribution to the improvement of operational safety of an aircraft. Even though the invention has been described with reference to particular embodiments, the invention is only limited by the subject-matter of the claims. In particular, it is obvious to the average person skilled in the art that all known means for blocking a bleed air line, for generating a warning signal, and for turning off an electrically or pneumatically controllable device can be used within the context of the invention.

List of Reference Numerals
1 Engine
2 Auxiliary power unit
3 Main supply line
4 Feed line from the gas generator
5 Controllable valve
6 On-off valve
7 Nonreturn valve
8 Feed line from external bleed air supply
9 High-pressure ground connection
10 Consumer system
11 Feed line to consumer system
12 Safety device
13 Connection display device for generating a ground connection signal
  13a acoustic warning device, 13b visual warning device
14 Opening signal device for generating an opening signal
15 Filter device for generating an alarm signal

What is claimed is:

1. A bleed air supply system for supplying bleed air to an aircraft with several bleed air supply lines between one or several bleed air sources and one or several consumers, each comprising at least one valve for setting the flow-through quantity passing through the bleed air supply line, and a safety device for closing the valve in at least one of the several bleed air supply lines depending on an alarm signal that indicates an opening in at least one of the several bleed air supply lines, wherein the safety device comprises:
   a connection display device for generating a ground connection signal when a bleed air supply line of the aircraft is connected to a high-pressure ground connection, and
   a filter device for generating the alarm signal depending on the ground connection signal and on an opening signal from an opening signal device, which opening signal indicates any opening of the bleed air supply line that is connected to the high-pressure ground connection, the filter device being configured such that the alarm signal is only produced where both an opening signal and a ground connection signal are present.

2. The supply system according to claim 1, wherein an on-off valve is arranged in the bleed air supply line connected to the high-pressure ground connection, which on-off valve can be controlled depending on the opening signal.

3. The supply system according to claim 1, wherein a signal output connection for emitting the opening signal to an external bleed air supply source is connected to the high-pressure ground connection.

4. The supply system according to claim 3, wherein the signal output connection is integrated in the high-pressure ground connection of the aircraft.

5. The supply system according to claim 3, wherein the signal output connection is connected to a control console of the aircraft.

6. The supply system according to claim 1, wherein a warning device for generating an alarm signal depending on the opening signal is provided.

7. The supply system according to claim 6, wherein the warning device comprises an acoustic warning device for generating an acoustic alarm sound, and/or comprises a visual warning device for generating a visual alarm signal in the external region of the aircraft.

8. A method for controlling a bleed air supply system for supplying bleed air to an aircraft with several bleed air supply lines between one or several bleed air sources and one or several consumers, each comprising at least one valve for setting the quantity flowing through the bleed air supply line, and a safety device for closing the valve in at least one of the several bleed air supply lines depending on an alarm signal that indicates an opening in at least one of the several bleed air supply lines, wherein the method also comprises:

generating a ground connection signal by a connection display device when a bleed air supply line of the aircraft is connected to a high-pressure ground connection; and generating the alarm signal with a filter device depending on the ground connection signal and an opening signal from an opening signal device, which alarm signal indicates opening of the bleed air supply line connected to the high-pressure ground connection of the safety device, the alarm signal only being produced where both an opening signal and a ground connection signal are present.

9. The method according to claim 8, wherein an on-off valve is closed depending on the opening signal, which on-off valve is arranged in the bleed air supply line that is connected to the high-pressure ground connection.

10. The method according to claim 8, wherein the opening signal is issued to an external bleed air supply source that is connected to the high-pressure ground connection by way of a signal output connection.

11. The method according to claim 8, wherein the generation of an alarm signal by a warning device depending on the opening signal.

12. The method according to claim 11, wherein the warning device emits an acoustic alarm sound and/or a visual alarm signal in the outside region of the aircraft.

13. The method according to claim 11, wherein the warning device indicates the position of the leak with a specified accuracy.

* * * * *

UNITED STATES PATENT AND TRADEMARK OFFICE
CERTIFICATE OF CORRECTION

PATENT NO.        : 8,516,826 B2                                        Page 1 of 1
APPLICATION NO.   : 12/083008
DATED             : August 27, 2013
INVENTOR(S)       : Rostek et al.

It is certified that error appears in the above-identified patent and that said Letters Patent is hereby corrected as shown below:

On the Title Page
For item 73 (Assignee)
   Replace "Airbus Operations, Hamburg (DE)"
   With -- Airbus Operations GmbH, Hamburg (DE) --

Signed and Sealed this
Twenty-second Day of April, 2014

Michelle K. Lee
*Deputy Director of the United States Patent and Trademark Office*